US012649673B2

(12) United States Patent
Peulon et al.

(10) Patent No.: US 12,649,673 B2
(45) Date of Patent: Jun. 9, 2026

(54) SYNTHESIS OF COMPOSITE BEADS COATED WITH LAYERED MANGANESE OXIDE AND USE OF SUCH BEADS TO REMOVE TOXIC ELEMENTS CONTAINED IN FLUIDS

(71) Applicants: Centre National de la Recherche Scientifique, Paris (FR); Commissariat à l'Energie Atomique et aux Energies Alternatives, Paris (FR); CY CERGY PARIS UNIVERSITE, Cergy (FR); Université d'Evry Val d'Essonne, Evry-Courcouronnes (FR)

(72) Inventors: Sophie Peulon, Morsang-sur-Orge (FR); Anne Pensel, Alfortville (FR)

(73) Assignees: CENTRE NATIONAL DE LA RECHERCHE SCIENTIQUE, Paris (FR); COMMISSARIAT AL'ENERGIE ATOMIQUE ET AUX ENEGIES ALTERNATIVES, Paris (FR); CY CERGY PARIS UNIVERSITE, Cergy (FR); UNIVERSITE D'EVRY VAL D'ESSONNE, Evry-Courcouronnes (FR)

( * ) Notice: Subject to any disclaimer, the term of this patent is extended or adjusted under 35 U.S.C. 154(b) by 700 days.

(21) Appl. No.: 18/017,435

(22) PCT Filed: Jul. 22, 2021

(86) PCT No.: PCT/FR2021/051370
§ 371 (c)(1),
(2) Date: Jan. 23, 2023

(87) PCT Pub. No.: WO2022/018383
PCT Pub. Date: Jan. 27, 2022

(65) Prior Publication Data
US 2023/0303411 A1 Sep. 28, 2023

(30) Foreign Application Priority Data

Jul. 23, 2020 (FR) ..................................... 2007733

(51) Int. Cl.
*C02F 1/28* (2023.01)
*C02F 101/20* (2006.01)
(Continued)

(52) U.S. Cl.
CPC ................ *C02F 1/288* (2013.01); *C25D 9/08* (2013.01); *C25D 17/20* (2013.01); *C02F 2101/206* (2013.01); *C02F 2101/301* (2013.01)

(58) Field of Classification Search
CPC ................ C02F 1/288; C02F 2101/206; C02F 2101/301; C25D 9/08; C25D 17/20
(Continued)

(56) References Cited

U.S. PATENT DOCUMENTS

| | | | | | |
|---|---|---|---|---|---|
| 7,635,461 B2 * | 12/2009 | Anderson | ................. | C10L 1/12 | |
| | | | | | 502/352 |
| 7,670,679 B2 * | 3/2010 | Krishna | .............. | H01M 4/9025 | |
| | | | | | 428/407 |

(Continued)

FOREIGN PATENT DOCUMENTS

| | | | | | |
|---|---|---|---|---|---|
| CN | 102502851 A | * | 6/2012 | ............. | C01G 45/02 |
| CN | 102515275 A | * | 6/2012 | ............. | C01G 45/02 |

(Continued)

OTHER PUBLICATIONS

English translation of Written Opinion for PCT/FR2021/051370. (Year: 2021).*

(Continued)

*Primary Examiner* — Patricia L. Hailey
(74) *Attorney, Agent, or Firm* — CANTOR COLBURN LLP

(57) ABSTRACT

The present invention relates to composite beads coated with H-Birnessite layered manganese oxide with a sheet nano-
(Continued)

11 structure, the average thickness of the sheets being between 1 and 50 nm, and the length L of the sheets being between 0.2 μm and 3 μm, as well as the manufacturing method thereof and a cell for producing said composite beads. The present invention also relates to the use of such beads in treatments for decontaminating fluids containing toxic elements such as heavy metals or organic pollutants.

15 Claims, 5 Drawing Sheets

(51) Int. Cl.
| | | |
|---|---|---|
| *C02F 101/30* | (2006.01) |
| *C25D 9/08* | (2006.01) |
| *C25D 17/20* | (2006.01) |

(58) Field of Classification Search
USPC .................. 429/224; 502/324; 428/403, 406
See application file for complete search history.

(56) References Cited

U.S. PATENT DOCUMENTS

| | | | | |
|---|---|---|---|---|
| 2010/0189615 A1* | 7/2010 | Gramiccioni | ......... | B01J 35/613 |
| | | | | 502/305 |
| 2012/0245019 A1 | 9/2012 | Adzic | | |

| 2013/0115453 A1* | 5/2013 | Fan | ...................... | H05K 1/0213 |
|---|---|---|---|---|
| | | | | 174/250 |

FOREIGN PATENT DOCUMENTS

| | | | | | |
|---|---|---|---|---|---|
| CN | 103785345 A | * | 5/2014 | .............. | B01J 20/06 |
| CN | 108671888 A | | 10/2018 | | |
| CN | 113871212 A | * | 12/2021 | ............. | H01G 11/26 |
| EP | 1698395 A1 | | 9/2006 | | |
| EP | 2010285663 A | | 12/2010 | | |
| EP | 3067313 A1 | * | 9/2016 | ........... | H01M 4/134 |
| EP | 3121877 A1 | * | 1/2017 | ........ | C01G 45/1228 |
| JP | 2010285663 A | * | 12/2010 | ............. | C25D 17/16 |
| JP | 2011207725 A | * | 10/2011 | ............. | C01G 45/02 |
| JP | 2014137968 A | * | 7/2014 | ............. | H01L 31/04 |

OTHER PUBLICATIONS

International Search Report for corresponding application PCT/FR2021/051370 filed Jul. 22, 2021; Mail date Oct. 26, 2021.

M. Ndjeri, "In Situ grazing-incidence X-Ray diffraction during electrodeposition of birnessite thin films: Identificcation of Solid Precursors", Electrochemistry Communications 13 (2011) 491-494.

Masaharu Nakayama, "Electrochemical synthesis of birnessite-type layered manganese oxides for rechargable lithium batteries", Journal of Power Sources 179 (2008) 361-366.

* cited by examiner $$Na^+_{.30}(Mn^{4+}_{.69}Mn^{3+}_{.31})O_{.2} n(H_2O)$$

$$Mn^{2+}_{.05}Mn^{3+}_{.116}(Mn^{4+}_{.74}Mn^{3+}_{.093}\square_{.167})O_{1.7}(OH)_3$$

X 20,000

X 3,000

10

11

11

X 32

X 3,000

SYNTHESIS OF COMPOSITE BEADS COATED WITH LAYERED MANGANESE OXIDE AND USE OF SUCH BEADS TO REMOVE TOXIC ELEMENTS CONTAINED IN FLUIDS

TECHNICAL FIELD OF THE INVENTION

The present invention generally relates to conductive beads coated with a layered manganese oxide, as well as the manufacturing method thereof. The present invention also relates to the use of such beads in treatments for decontaminating fluids containing toxic elements such as heavy metals or organic pollutants.

TECHNICAL BACKGROUND

It is known to the person skilled in the art to use natural manganese oxides (manganiferous sands) in the treatment of drinking water to eliminate natural toxic elements such as arsenic. Indeed, natural manganese oxides are known to be non-toxic materials, which are certainly impure, but have large absorption and oxidation capacities. However, their removal capabilities are quite low and not constant due to the fact that it is in reality variable mixtures of natural manganese oxides, which are not very crystallized or even amorphous, and impure.

In order to overcome these drawbacks, the Applicant has developed a method for electrochemistry synthesis of thin films of pure manganese oxides deposited on a planar conductive support[1] to [5], with perfectly controlled nano-structures (as shown in [FIG. 6]). These thin films of manganese oxides are pure and have elimination capacities that are much higher than the manganiferous sands usually used for the treatment of potable mineral water. However, the fact that they are deposited in the form of thin films on planar plates of centimetric size is not compatible with direct use in current industrial facilities for decontamination.

In order to remedy these drawbacks, the Applicant has developed a method for depositing manganese oxide on essentially spherical particles, and in particular of millimetric size, since the industries that specialize in pollution removal treatments commonly use powder materials. The major difficulties were to obtain on these objects of milli-metric size a deposit with the same quality as those synthesized on a planar plate of centimetric size, and to carry out this deposition on several beads at a time, in order to be able to consider possible production at a larger scale. For this purpose, the applicant has developed a method for synthe-sizing layered oxide on conducting particles by electrode-position, especially stainless steel.

It is known to a person skilled in the art to deposit a manganese oxide on glass beads by chemical means, in order to develop filters and replace the manganiferous sands[6]. However, nothing is said in this scientific publica-tion regarding the structure of the manganese oxide formed on the surface of these beads. In addition, the manganese oxide is not deposited by electrodeposition, but by the dry route (sol-gel and sputtering) and by wet route by precipi-tation in a basic medium in the presence of an oxidant. However, they are long and difficult methods to implement and the manganese oxide formed does not have a nanostruc-ture, which makes it more fragile. Furthermore, the sorption properties of these materials are too low since it is less than mg/g for manganese sorption.

SUMMARY OF THE INVENTION

Consequently, the applicant has developed composite beads each comprising a support particle made of conductive material, said support particle having a three-dimen-sional shape, and a continuous and nanostructured coating covering said support particle, said coating consisting of a layered manganese oxide belonging to the phyllomangan-ates family and having a nanostructure in the form of sheets of average thickness e and length L, said bead being characterized in that:

the layered manganese oxide constituting the coating is H-Birnessite with sheets whose average thickness is between 1 and 50 nm, and is preferably of the order of 10 nm, and whose length L is between 0.2 μm and 3 μm, and preferably of the order of 0.5 μm.

The term "conductive material" is understood to mean, within the meaning of the present invention relating to the synthesis of layered oxide on beads by electrodeposition, an electrically conductive material.

Advantageously, the support particle conductive material may be chosen from the group consisting of glasses covered with a semiconductor, semiconductors, stainless steels, noble metals and mixtures thereof.

Since the coating formed a layered manganese oxide is a black coating (as shown in [FIG. 7] (right part) and [FIG. 8]), this makes it possible to distinguish the composite beads according to the invention which are coated with layered manganese oxide in accordance with the invention (black-colored beads) from the support beads ([FIG. 7]: the left part: these beads exhibit a metallic radiance when they are stainless steel beads).

For the purposes of the present invention, the term "con-tinuous coating" means a coating covering at least 50% of the outer surface of the support particle, preferably at least 80% and better still at least 90% of the outer surface of the support particle.

The Birnessite is a layered manganese oxide of general formula (1):

$$Mn(III)_x Mn(IV)_y O_z \quad (1)$$

with x, y and z defining natural integers such that $z=(3x+4y)/2$.

The Birnessite is a very complex layered manganese oxide of the phyllomanganates family. This compound is usually defined by different formulae, and sometimes wrongly treated as $MnO_2$. The natural compound is gener-ally not very crystallized; it is composed of sheets contain-ing at least Mn(III) and Mn(IV), with optionally a little adsorbed Mn(II), and hydrated cations inserted between these sheets, as illustrated in [FIG. 1]. The sheets containing Mn(III) and Mn(IV) are non-stoichiometric with a charge deficit due to the presence of Mn(III), which is compensated by hydrated cations inserted between the sheets so that the whole is neutral. The sheets repeat on average every 7.2 Å, along the axis c. This distance depends on the nature of the inserted cation.

The nature of the most common inserted cations are $Na^+$ (Na-Birnessite), $K^+$ (K-birnessite) and $H^+$ (H-Birnessite). The nature of the cation influences not only the structure but also the reactivity of the Birnessite. [FIG. 1] shows an example of the crystalline structure of triclinic Birnessite (left part of [FIG. 1]) and an example of a hexagonal Birnessite (right part of [FIG. 1]).

In the context of the present invention, the layered man-ganese oxide constituting the coating of layered manganese oxide covering the support particles is H-Birnessite. This is a hexagonal birnessite with the theoretical formula $Mn_7O_{13}$, $5H_2O$ according to the X-ray Diffraction patterns, and in practice of the formula $(Mn_2(III)Mn_5(IV)O_{13})$. There are other formulas to define the H-Birnessite. This is due to the fact that the respective proportions of the species Mn(III) and Mn(IV) in the compound can change according to the synthesis conditions, and induce the presence of gaps to a varying degree. The presence of these gaps is important in order to obtain high sorption capabilities.

The synthesis of birnessite by the chemical route by oxidation of Mn(II) in solution is carried out at very basic pH levels greater than 8, and that, as a result, the Na-Birnessite or K-Birnessite is systematically obtained, depending on the nature of the base added in order to increase the pH, and not the H-birnessite. Indeed, if it is desired to obtain the H-birnessite by chemical synthesis via the oxidation of Mn(II), it is necessary to go through an additional step which may be lengthy, based on exchanges of cations in a very acidic medium over several hours, or even several days.

On the other hand, by the electrochemical route, as is the case in the present invention, a deposit of the H-birnessite with a perfectly defined and reproducible nanostructure is directly obtained since the surface precipitation of the bead is induced by electrochemistry via the oxidation of Mn(II), and this only near the surface of the bead, and even at acidic pH levels. In addition, this oxidation causes the deposition directly on the surface of the conducting bead via the formation of nucleation seeds, and can be done on smooth supports without the presence of porous sub-layer(s), which is not the case for the deposition of Birnessite by the chemical route which requires the deposition of an intermediate layer such as chemically synthesized iron oxide prior to the synthesis of the birnessite deposit (as taught by European patent application EP 1698395[7]).

Preferably, use will be made, as a conductive material of the support particle, of stainless steel, and better still a stainless steel comprising 0.02% of C, 16 to 18% of Cr, 10.5 to 13% of Ni, 2 to 2.5% of Mo, 1% of Si, 2% of Mn, 0.04% of P and 0.03% of Si. Such a steel is usually known under the following designations: 316L according to the AISI standard in the United States of America, and Z2CND17-12 according to the AFNOR NF A 35573 standard in France.

Advantageously, the support particles may have a spherical shape of diameter D, which may preferably be between 0.3 mm and 2 mm.

The composite beads according to the invention have the advantage of being able to be inserted directly into current industrial decontamination facilities without requiring any modification of these installations and of these filters due to the fact that the composite beads covered have dimensions similar to the manganiferous sands currently used.

Thus, the subject of the present invention is also the use of the beads according to the invention, in a method for decontaminating a fluid containing at least one toxic element, for example a heavy metal or an organic pollutant. This fluid may be an aqueous solution or a gas.

According to a first embodiment, the fluid to be decontaminated is an aqueous solution containing an organic pollutant selected from the group consisting of detergents, drug residues, pesticides and especially herbicides, organic dyes, formaldehyde, and aminoalkylphosphonic acids and/or at least one metallic toxic element selected from heavy metals such as lead, cadmium, copper, nickel, and arsenic, and from metals such as manganese, iron, and mixtures thereof.

In particular, as a herbicide that can be contained in the fluid to be decontaminated, mention may be made of an herbicide containing N-(phosphonomethyl)glycine, which is the active ingredient of the herbicide sold under the trademark Roundup®.

As organic dyes that can be contained in the fluid to be decontaminated using composite beads according to the invention, mention may in particular be made of indigo carmine and methylene blue.

As an aminoalkylphosphonic acid that can be contained in the fluid to be decontaminated using the composite beads according to the invention, aminomethylphosphonic acid (generally known under the acronym AMPA) may be cited. AMPA is the main metabolite of glyphosate, even more toxic and persistent than glyphosate. AMPA can also come from the degradation of the phosphonates used as anti-scalants in industrial and domestic detergents.

For example, it is possible to use the composite beads according to the invention for potable underground water treatment to eliminate toxic elements such as manganese and arsenic by sorption reactions (such as generally in the form of manganiferous sands and activated carbons) or organic pollutants such as pesticides for example by degradation reactions. Unlike activated carbons which eliminate toxic elements only by sorption reactions, the composite beads according to the invention are also capable of degrading organic pollutants.

The composite beads according to the invention may also be used for the treatment of wastewater of very diverse origins (for example drinking water, or wastewater from industrial sites or cleaning water, or raw water (water that has not undergone any treatment).

According to a second embodiment, the fluid to be decontaminated is gaseous and the toxic element an organic pollutant can in particular be selected from the group consisting of pesticides such as glyphosate and formaldehyde.

The present invention also relates to a cell suitable for the electrodeposition of a coating of layered manganese oxide on support particles made of conductive material and of three-dimensional shape, said electrochemical cell including:

a compartment for receiving an electrolytic solution, wherein are arranged a reference electrode, a working electrode serving as an anode, and a counter electrode serving as a cathode, said electrochemical cell being characterized in that said working electrode consists of a conductive substrate on which said support particles are arranged, said conductive substrate constituting the bottom of said electrochemical cell, and said counter-electrode consists of a carbonaceous material covering said compartment, the conductive substrate and said counter-electrode being arranged facing each other while being separated by a distance equal to or less than 1 cm, and in that said electrochemical cell further comprises an outer tank intended to be in fluid communication with said compartment by means of pumps, the volume of the outer tank representing at least three times that of said compartment, said pumps being able to circulate said electrolytic solution in said electrochemical cell.

The volume of the outer tank represents at least three times, and preferably at least six times that of said compartment, in such a way as to i) prevent the presence of air bubbles in the electrochemical cell, which results in anon-homogeneous deposition of manganese oxide and to II) keep constant the Mn(II) concentration in the electrolytic solution.

The outer tank of the electrochemical cell according to the invention can advantageously be in the form of a tube. Use will advantageously be made of a tank that can contain about 15 mL of electrolytic solution, for a cell whose centimetric dimensions are of the order of 8 cm long by 3.2 cm wide.

The counter electrode of the electrochemical cell according to the invention may advantageously be a film of carbon-doped polyimide. It is for example possible to use the one sold by the company Goodfellow (sheet resistance 370 $\Omega/cm^2$)

As a conductive substrate constituting the working electrode, a stainless steel substrate, or a substrate made of fluorine-doped tin oxide, may in particular be used. For example, the conductive tin oxide substrate sold by SOLEMS (sheet resistance 120 $\Omega/cm^2$) will be used.

As a reference electrode, it is possible for example to use an Ag/AgCl silver chloride electrode (0.1 M NaCl; Eref=0.29 V/SHE).

Finally, the present invention also relates to a method for manufacturing composite beads according to the invention, by electrodeposition of a manganese oxide coating of H-Birnessite type on support particles made of conductive material and having a three-dimensional shape, said method comprising the following steps:

A) providing an electrochemical cell according to the invention as defined previously, B) filling said compartment of said electrochemical cell with an aqueous electrolytic solution containing dissolved oxygen and Mn (II) ions;

C) circulating using the pumps of the electrolytic solution between said compartment and said tank at a flow rate between 0.5 mL/minute and 3 mL/minute, and preferably between 1 mL/minute and 3 mL/minute;

D) applying a potential E between the working electrode (23) and the reference electrode (22) of between 0.8 V and 1.1 V, so as to electrodeposit the Mn(II) ions on the surface of the support particles (10) according to equation (1):

$$(x+y)\text{Mn(II)}+z\text{H}_2\text{O}\rightarrow\text{Mn(III)}_x\text{Mn(IV)}_y\text{O}z+2z\text{H}^++n\ e-\qquad(1)$$

with

Mn(III)$_x$Mn(IV)$_y$O$_z$ constituting a layered manganese oxide having a sheet nano structure, and n, x, y and z defining natural integers such that n=2z−2 (x+y) et z=(3x+4y)/2.

To carry out the method for manufacturing composite beads according to the invention, the electrochemical cell according to the invention as defined previously (step A) is used.

The second step of the method according to the invention (step B) consists of filling the compartment of the electrochemical cell with an aqueous electrolytic solution containing dissolved oxygen and Mn(II) ions.

Advantageously, the electrolytic solution may comprise:

manganese sulfate MnSO$_4$ the concentration of which is between $10^{-4}$ M and $5\cdot10^{-3}$ M, preferably between $10^{-3}$ M and 5.$10^{-3}$ M, and better still of the order of $1.6\cdot10^{-3}$ M, and a support electrolyte consisting of sodium sulfate Na$_2$SO$_4$, the concentration of which is preferably of the order of 0.4 M.

Advantageously, the pH of the electrolytic solution may be at most 8, preferably comprised between 2 and 6, and better still between 5 and 6.

The third step of the method (step C) consists of circulating the electrolytic solution using the pumps, between said compartment and said tank at a flow rate between 0.5 mL/minute and 3 mL/minute, and preferably between 1 mL/minute and 3 mL/minute. This makes it possible, when a potential E is applied between the working electrode and the reference electrode (see step D of the method), to avoid depleting the concentration of Mn(II) ions of the electrolytic solution, so that the concentration of Mn(II) ions in said compartment is at least equal to 80% of the value of the concentration of Mn(II) ions in the outer tank.

The fourth step of the method (step D) consists of applying a potential E between the working electrode indicated above and the reference electrode comprised between 0.8 V and 1.1 V, so as to oxidize the Mn(II) ions at the surface of the support particles according to the equation indicated above to electrodeposit the H-Birnessite.

When using as the reference electrode, in the method according to the invention, an Ag/AgCl/0.1 M NaCl silver chloride electrode, whose potential is Eref=0.29 V/SHE, the range of the potential E tested may be between 0.8 V and 1.1 V.

In other words, the deposition of the material containing manganese is done at the working electrode, on the support particles, by imposing the potential E. This will cause, at the working electrode, the oxidation of soluble species Mn (II), initially present in solution, and produce insoluble species Mn(III) and Mn(IV) which will precipitate only at the working electrode, and this directly in the form of a nano-structured thin film of Birnessite. During the oxidation reaction, there is no solid present in solution (no powder). The principle of the deposition is illustrated in FIG. 2 in the case of the formation at the anode of the H-Birnessite of theoretical formula Mn$_7$O$_{13}$,5H$_2$O (hydrated form of the formula).

At the counter electrode, the electrochemical reaction can consist of a reduction in the water or the dissolved oxygen.

BRIEF DESCRIPTION OF THE FIGURES

Further advantages and particularities of the present invention will become apparent from the following description, given as a non-limiting example and made with reference to the attached figures and examples:

[FIG. 1], [FIG. 2] and [FIG. 6] to [FIG. 8] have been described in the descriptive part relating to the preceding prior art, and [FIG. 7] to [FIG. 12] are described in greater detail in the examples which follow, which illustrate the invention without limiting the scope thereof.

DETAILED DESCRIPTION OF THE INVENTION

Figure 1:
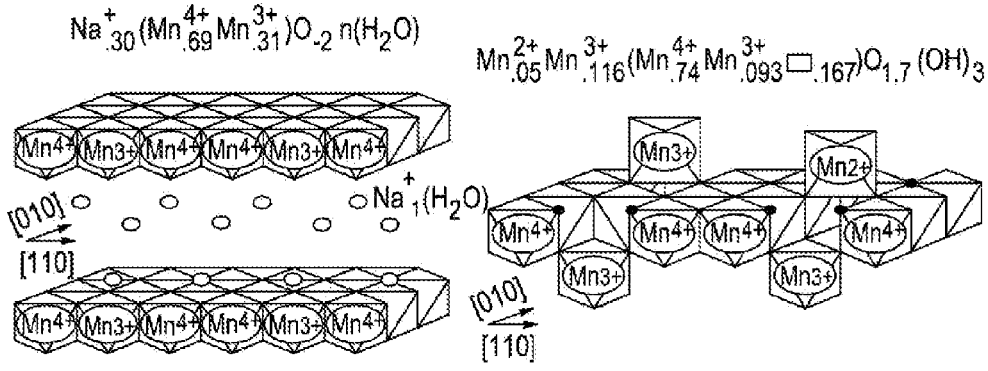
FIG. 1 shows schematic representations of a triclinic Birnesitic structure (left part of [FIG. 1]) and of a hexagonal Birnessite structure (right part of [FIG. 1])
Figure 2:
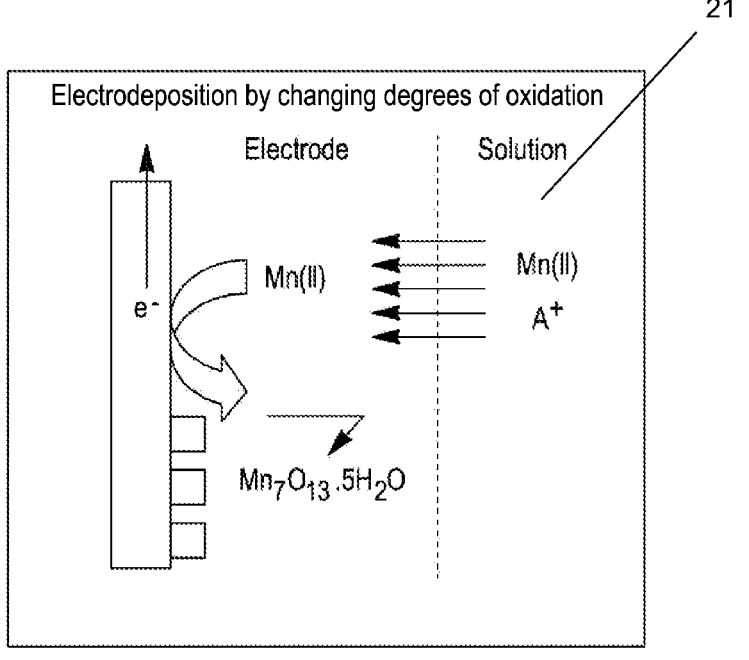
FIG. 2 schematically represents the deposit of H-Birnessite (Mn$_7$O$_{13}$,5H$_2$O) at the anode during step C of the method according to the invention.
Figure 3:
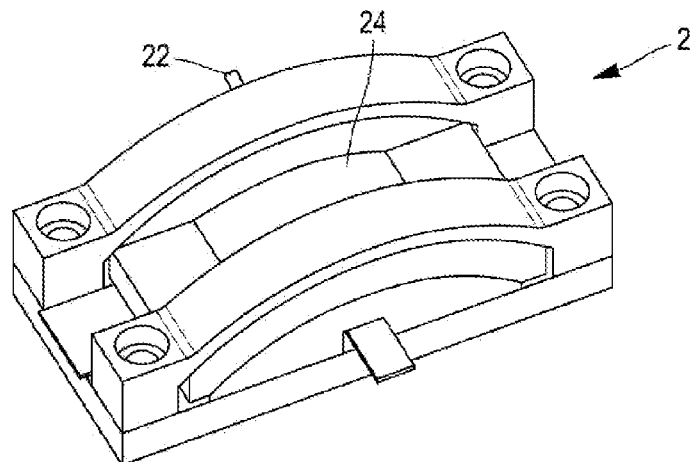
FIG. 3 shows a schematic top view of an electrochemical cell according to the invention.
Figure 5:
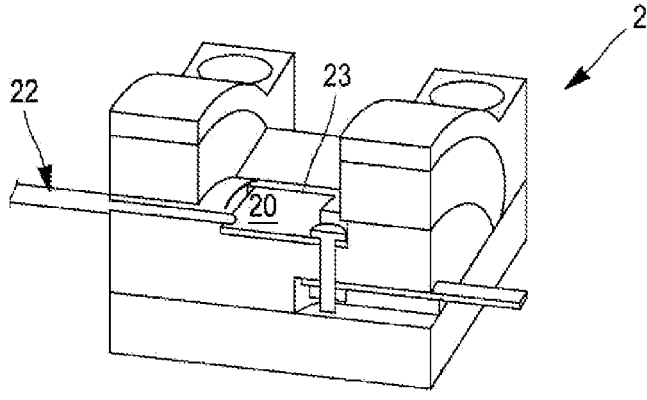
FIG. 5 shows a schematic view in lateral section along the lateral axis x of the electrochemical cell shown in [FIG. 3] and [FIG. 4]

[FIG. 3] to [FIG. 5] schematically illustrate an example electrochemical cell 2 according to the invention which comprises a compartment 20 intended to receive an electrolytic solution 21, and wherein a reference electrode 22, a working electrode 23 acting as anode, and a counter electrode 24 acting as cathode are arranged.

In the electrochemical cell according to the invention 2, the space between the counter electrode 24 (acting as cathode) and the working electrode 23 (anode) constitutes the compartment 20 intended to contain the electrolytic solution 21.

The working electrode 23 (anode) is made up of a conductive substrate made of $SnO_2$ doped with fluorine (having a contact surface of 2.25 $cm^2$) which is sold by SOLEMS (120 $\Omega/cm^2$), and support beads 10 which are arranged on the substrate.

Moreover, as reference electrode 22, an Ag/AgCl/0.1 M NaCl silver chloride electrode (3 mm in diameter) whose potential is Eref=0.29 V/SHE is used.

As regards the counter electrode 24, it is a counter electrode 24 of large surface area advantageously consisting of a carbon-doped polyimide film (kapton). It is for example possible to use the material sold by the company Goodfellow (sheet resistance 370 $\Omega/cm^2$)

The volume of the compartment 20 is very small (less than 2 mL) because the electrodes 23, 24 are parallel and separated from one another by a distance of less than 1 cm (in particular of the order of a few millimeters). Thus, the thickness of the electrolytic solution 21 (not visible in FIGS. 3 to 5) located above the conductive substrate constituting the working electrode 23 is less than or equal to 1 or 2 mm, and the stainless steel beads 10 are very close to the electrodes 23, 24.

Figure 4:
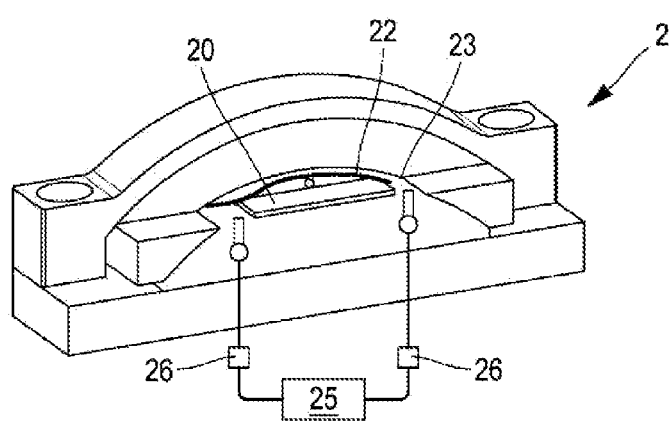
FIG. 4 shows a schematic view in longitudinal section along the longitudinal axis x of the electrochemical cell shown in FIG. 3.

Furthermore, [FIG. 4] shows more particularly that in the electrochemical cell 2, the electrolytic solution 21 in continuous flow between the compartment 20 and an outer tank 25, containing approximately 15 mL of electrolytic solution and in fluid communication with this compartment 20 by means of pumps 26 (and more particularly micro-pumps) capable of circulating the electrolytic solution 21 in the electrochemical cell 2 at a flow rate of the order of 1 mL/minute. This allows a low but continuous renewal of the electrolytic solution 21.

EXAMPLES

First Example Embodiment (Comparative): Electrodeposition of Layered Manganese Oxide on a Stainless Steel Plate In a conventional electrochemical cell, the deposition of layered manganese oxide is carried out on a Z2CND17-12 stainless steel plate according to the AFNOR NF A 35573 standard.

In this cell, use is made, as a reference electrode 22, of a Hg/Hg2SO4/K2SO4 mercurous sulfate electrode. The potential at 25° C. of the saturated Hg/Hg2SO4/K2SO4 electrode with respect to the standard hydrogen electrode is: E=0.6513 V/SHE. It is however also possible to work with a saturated calomel electrode (SCE: the potential of the SCE at 25° C. relative to the standard hydrogen electrode is E=0.2412 V at 25° C.).

The duration of the test is of the order of 1 hour.

Figure 6:
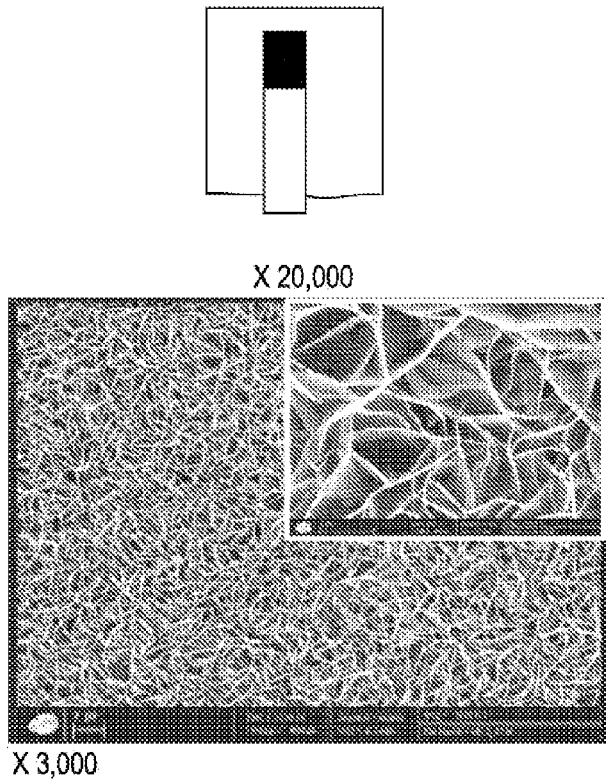
FIG. 6 shows a photograph taken with an optical microscope of a stainless steel plate, which is coated with H-Birnessite by electrodeposition in a conventional electrochemical cell in accordance with a method of the prior art developed by the Applicant, as well as a photograph taken with a scanning electron microscope (magnification ×3000, with an enlarged area at magnification ×20,000) showing that this layered oxide has a sheet structure.
Figure 7:
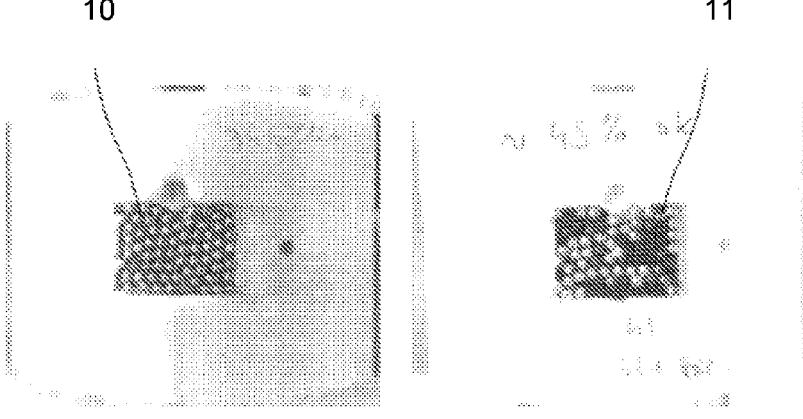
FIG. 7 shows a photograph of stainless steel beads coated with layered manganese oxide in accordance with the method according to the invention: these photographs show that the degree of coverage of the beads by manganese oxide is at least 80%.

FIG. 6 shows a photograph taken with an optical microscope of a stainless steel plate, which is coated with H-Birnessite by electrodeposition in a conventional electrochemical cell in accordance with a method of the prior art developed by the Applicant, as well as a photograph taken with a scanning electron microscope (magnification ×3000, with an enlarged area at magnification ×20,000) showing that this layered oxide has a sheet structure.

Second Example Embodiment: Electrodeposition of Layered Manganese Oxide on Stainless Steel Beads (with a Diameter of 2 mm) in Accordance with the Method According to the Invention Use is made, as support particles 10, of Z2CND17-12 stainless steel beads according to the AFNOR NF A 35573 standard (with a diameter of 2 mm), which are deposited on the conductive substrate 20 of the working electrode 23, in the electrochemical cell 2 according to the invention shown in [FIG. 3] to [FIG. 5]. As regards the electrolytic solution 21, it has not been degassed and comprises manganese sulfate MnSO4 at a rate of $1.6 \cdot 10^{-3}$M, and sodium sulphate $Na_2SO_4$ at a rate of 0.4M. The free pH is between 5 and 6.

The electrolytic solution is circulated between the compartment 20 and the tank using the pumps 26, at an adjustable flow rate of the order of 1 mL/minute (step C of the method according to the invention) and a potential E is applied between the working electrode (23) and the reference electrode 22 of 0.9 V (step D of the method according to the invention). This leads to electrodepositing the Mn(II) ions on the surface of the support particles 10 according to the equation (1) indicated above, forming a layered manganese oxide coating 11 having a sheet nanostructure.

The continuous renewal of the electrolytic solution 21 in the electrochemical cell 2 makes it possible to avoid depletion of the concentration of Mn(II) ions in the electrolytic solution 21, such that the concentration of Mn(II) ions in the compartment is at least equal to 80% of the value of the concentration of Mn(II) ions in the outer tank 25.

In the present test, the duration is typically of the order of 2 to 20 hours, and typically in order to avoid depletion of the electrolytic solution, while making it possible to ensure a homogeneous deposition of layered manganese oxide.

Figure 8:
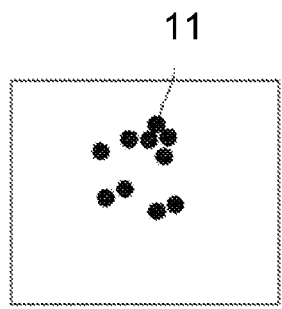
FIG. 8 is a photograph of composite beads according to the invention entirely coated with layered manganese oxide electrodeposited in accordance with the method according to the invention.
Figure 10:
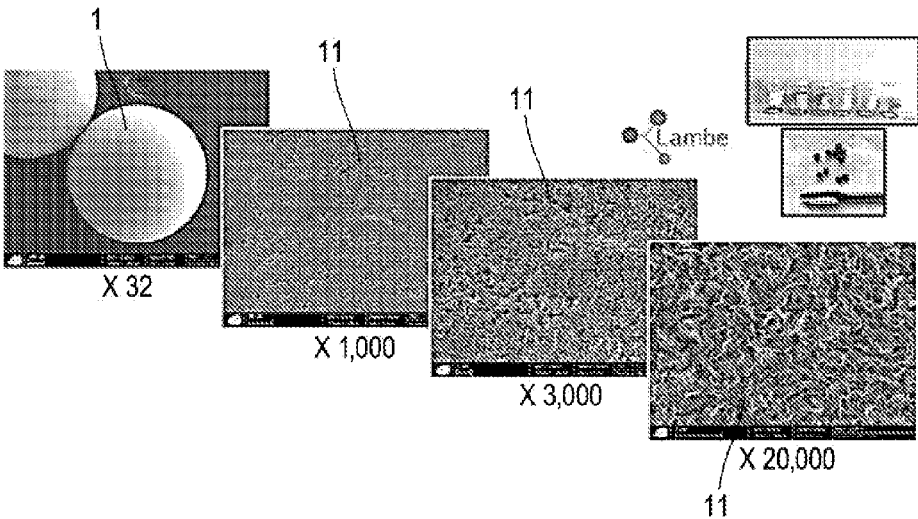
FIG. 10 shows a first photograph taken with a scanning electron microscope (×32) of a stainless steel bead (with a diameter of 2 mm) coated with layered manganese oxide in accordance with the method according to the invention (left photograph), as well as three photographs taken with an electron microscope of this bead at different magnifications (respectively ×1000, ×3000 and ×20,000 from left to right)

FIG. 8 is a photograph of composite beads according to the invention entirely coated with layered manganese oxide and [FIG. 10] shows a first photograph taken with a scanning electron microscope (×32) of a stainless steel bead (with a diameter of 2 mm) coated with layered manganese oxide in accordance with the method according to the invention (left photograph).

Figure 9:
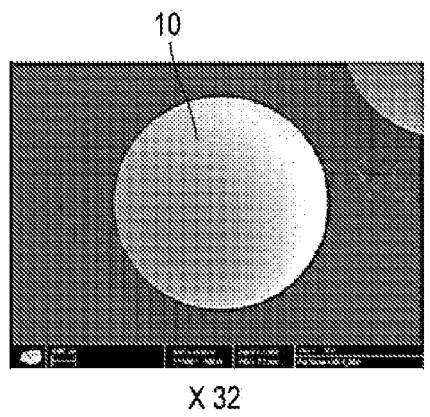
FIG. 9 shows two photographs taken with a scanning electron microscope (×32 and ×3000) of a bare stainless steel bead (with a diameter of 2 mm) prior to the deposition of layered manganese oxide according to the method according to the invention.
Figure 9:
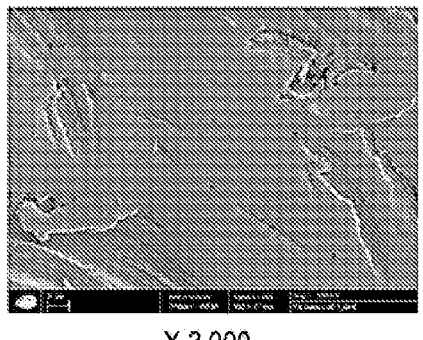

FIG. 9 shows photographs taken with a scanning electron microscope (×32 and ×3000) of a bare stainless steel bead (with a diameter of 2 mm) prior to the deposition of layered manganese oxide according to the method according to the invention; FIG. 9 clearly shows that the surface of the stainless steel bead is perfectly smooth without any particular nanostructure.

Characterization by Scanning Electron Microscopy (SEM)

The coating 11 of layered manganese oxide was characterized by scanning electron microscopy (SEM), as illustrated by the three SEM photographs of [FIG. 10] carried out at different magnifications (respectively ×1000, A3000 and ×20,000 from left to right). These SEM photographs show that the deposition of layered manganese oxide is very homogeneous and very nanostructured, and resembles that obtained on a stainless steel plate in example 1: The sheet structure shown in [FIG. 6] (example 1, deposition on a stainless steel plate) is very similar to that shown by the SEM photograph of [FIG. 10] (deposition on stainless steel beads) obtained with a magnification ×20,000).

In the present example, the sizes of the sheets (length L and thickness e) of the manganese oxide coating are ten times smaller than those obtained on stainless steel plates (cf. comparative example 1), but this difference in size is due to the experimental conditions.

Characterization by RAMAN Spectroscopy

Figure 12:
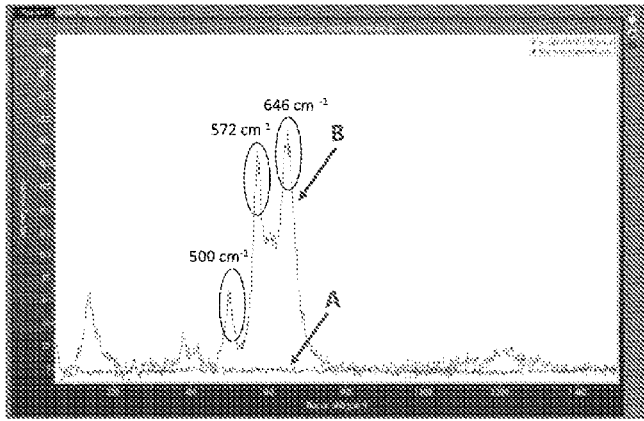
FIG. 12 shows the Raman spectrum (curve B) of a stainless steel bead coated with layered manganese oxide in accordance with the method according to the invention, in comparison with the spectrum of an uncoated stainless steel bead (curve A)

The coating 11 of layered manganese oxide was also characterized by RAMAN spectroscopy, as illustrated by FIG. 12.

Figure 11:
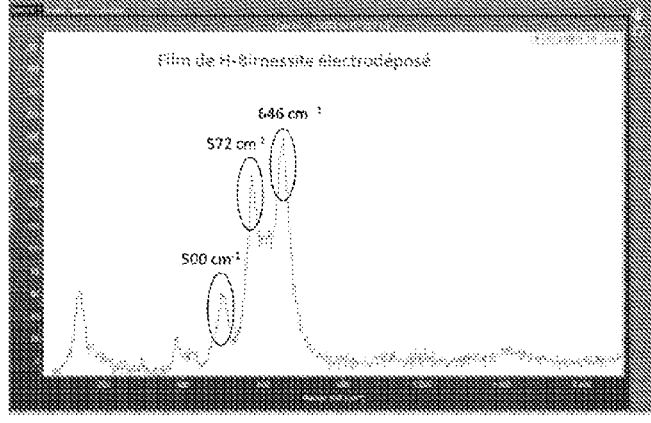
FIG. 11 is the Raman spectrum of an H-Birnessite film electrodeposited on a $SnO_2$-covered glass plate doped with fluorine, sold by SOLEMS (120 $\Omega/cm^2$), under the conditions developed in the prior work of the applicant[5]. The bands present on this spectrum are characteristic of H-Birnessite according to the scientific literature[8].

Raman spectroscopy makes it possible to identify the nature of the compounds via the presence of characteristic bands. Thus, for the H-birnessite, the characteristic bands correspond to the three bands circled and located respectively at 500 cm$^{-1}$, 572 cm$^{-1}$, 646 cm$^{-1}$ according to one of the main references of the literature indicated below (measurements on birnessite powders). FIG. 11 shows that these same bands are obtained for films synthesized by electrochemistry identified as being H-Birnessite according to the values from the scientific literature[8].

In comparison with FIG. 11, FIG. 12 together shows the spectrum of a stainless steel bead without deposition (substrate alone, lower curve A) with the spectrum of a composite bead according to the invention covered with a deposition synthesized by electrochemistry (upper curve B). As can be seen, the characteristic bands of the electrodeposited coating on the beads are located exactly at the same values as those of the films, thus confirming that it is indeed H-Birnessite.

LIST OF REFERENCES

[1] "*In situ grazing-incidence X-ray diffraction during electrodeposition of birnessite thin films: Identification of solid precursors.*" M. Ndjeri, S. Peulon, M. L. Schlegel, A. Chaussé, Electrochemistry Communication, 13 (2011) 491-494.

[2] "*In situ XANES measurements during electrodeposition of thin film: Example of birnessite, a promising material for environmental applications*" A. Pensel, S. Peulon, Electrochimica Acta 281 (2018) 738-745.

[3] "*Etudes fondamentales de diverses interfaces, solide-liquide et liquide-liquide, pour des applications environnementales*" S. Peulon, Soutenance de HDR, Université d'Evry, Septembre 23, 2015.

[4] "*Développement d'une cellule electrochimique permettant la caractérisation in situ par diffraction de rayons X rasants: étude de l'électrodépôt de la bimessite.*" M. Ndjeri, S. Peulon, M. L. Schlegel, A. Chaussé, Journées d'Electrochimie JE' 11, Grenoble, France, Jul. 4-8, 2011.

[5] "*Couplage électrochimie-spectroscopie EXAFS/XANES (XAS): Etude in situ et en temps réel de l'électrodépôt de birnessite*" A. Pensel, S. Peulon, A. Chaussé, JE'20 1 7, Journées d'Electrochimie 2017, Bordeaux, France.

[6] "*Coating techniques for glass beads as filter media for removal of manganese from water*" Peter Rose, Simon Hager, Karl Glas, Dirk Rehmann and Thomas Hofmann, Water Science & Technology: Water Supply, 17.1, 2017, 95-106.

[7] EP 1698395 (A1) European patent application: *An adsorptive-filtration media for the capture of waterborne or airbone constituents.*

[8] "*Raman spectra of birnessite manganese dioxides. Solid State Ionics*", Julien, C., Massot, M., Baddour-Hadjean, R., Franger, S., Bach, S. & Pereira-Ramos, J. P. (2003). 159(3-4), 345-356.

The invention claimed is:

1. A composite bead comprising a support particle made of conductive material, said support particle having a three-dimensional shape, and a continuous and nanostructured coating covering said support particle, said coating consisting of a layered manganese oxide belonging to the phyllomanganates family and having a nanostructure in the form of sheets of average thickness e and length L,
   wherein:
      the layered manganese oxide constituting the coating is H-Birnessite with sheets whose average thickness e is between 1 and 50 nm and whose length L of the sheets of said coating is between 0.2 μm and 3 μm.

2. The composite bead according to claim 1, wherein the conductive material of said support particle is selected from the group consisting of:
   glasses covered with a semiconductor,
   semiconductors,
   stainless steels,
   noble metals,
   and mixtures thereof.

3. The composite bead according to claim 1, wherein said support particles have a spherical shape.

4. The composite bead according to claim 3, wherein said support particles have a spherical shape with a diameter D between 0.3 mm and 2 mm.

5. A method for manufacturing composite beads according to claim 1, by electrodeposition of a coating of H-Birnessite layered manganese oxide on support particles made of conductive material and three-dimensional in shape, said method comprising the following steps:

A) providing an electrochemical cell including a compartment for receiving an electrolytic solution, wherein a reference electrode, a working electrode acting as an anode, and a counter electrode acting as a cathode are arranged, said working electrode consisting of a conductive substrate on which said support particles are arranged, said conductive substrate constituting the bottom of said electrochemical cell, and said counter electrode consisting of a carbonaceous material covering said compartment, said conductive substrate and said counter electrode being arranged facing each other while being separated by a distance equal to or less than 1 cm, and said electrochemical cell further including an outer tank intended to be in fluid communication with said compartment by means of pumps, the volume of said outer tank representing at least three times that of said compartment, said pumps being able to circulate said electrolytic solution in said electrochemical cell;

B) filling said compartment of said electrochemical cell with an aqueous electrolytic solution containing dissolved oxygen and soluble Mn (II) ions;

C) circulating using the pumps the electrolytic solution between said compartment and said tank at a flow rate between 0.5 mL/minute and 3 mL/minute;

D) applying a potential E between the working electrode and the reference electrode of between 0.8 V and 1.1 V, so as to electrodeposit the Mn(II) ions on the surface of the support particles (10) according to equation (1):

$$(x+y)Mn(II)+zH2O \rightarrow Mn(III)xMn(IV)yOz+2zH++ne- \quad (1)$$

with Mn(III)xMn(IV)yOz constituting a layered manganese oxide having a sheet nanostructure, and n, x, y and z defining natural integers such that $n=2z-2(x+y)$ and $z=(3x+4y)/2$.

6. The method according to claim 5, wherein the pH of the electrolytic solution is at most 8.

7. The method according to claim 6, wherein the pH of the electrolytic solution is between 2 and 6.

8. The method according to claim 6, wherein the pH of the electrolytic solution is between 5 and 6.

9. The method according to claim 5, wherein the electrolytic solution comprises:

manganese sulfate $MnSO_4$ the concentration of which is between $10^{-4}$ M and $5 \cdot 10^{-3}$ M, and a support electrolyte consisting of sodium sulfate $Na_2SO_4$.

10. The method according to claim 9, wherein the manganese sulfate concentration in the electrolytic solution is between $10^{-3}$ M and $5 \cdot 10^{-3}$ M.

11. The method according to claim 9, wherein the sodium sulfate concentration in the electrolytic solution is 0.4 M.

12. The method according to claim 5, wherein in step C) circulating using the pumps the electrolytic solution between said compartment and said tank is carried out at a flow rate between 1 mL/minute and 3 mL/minute.

13. A method for decontaminating a fluid containing at least one toxic element, comprising degrading the at least one toxic element with composite beads, wherein the composite beads comprise a support particle made of conductive material, said support particle having a three-dimensional shape, and a continuous and nanostructured coating covering said support particle, said coating consisting of a layered manganese oxide belonging to the phyllomanganates family and having a nanostructure in the form of sheets of average thickness e and length L, wherein the layered manganese oxide constituting the coating is H-Birnessite with sheets whose average thickness e is between 1 and 50 nm and whose length L of the sheets of said coating is between 0.2 μm and 3 μm.

14. The method according to claim 13, wherein the fluid to be decontaminated is an aqueous solution containing an organic pollutant selected from the group consisting of detergents, drug residues, pesticides, organic dyes, formaldehyde, and aminoalkylphosphonic acids and/or at least one metallic toxic element selected from the group consisting of lead, copper, cadmium, nickel, arsenic, manganese, iron, and mixtures thereof.

15. The method according to claim 13, wherein the fluid to be decontaminated is gaseous and the at least one toxic element is an organic pollutant selected from the group consisting of glyphosate and formaldehyde.

* * * * *